(12) United States Patent
Azad et al.

(10) Patent No.: US 9,769,848 B2
(45) Date of Patent: Sep. 19, 2017

(54) METHOD AND APPARATUS TO ACHIEVE COLLISION-FREE RANDOM ACCESS

(71) Applicant: SAMSUNG ELECTRONICS CO., LTD., Suwon-si (KR)

(72) Inventors: Amar Prakash Azad, Bangalore (IN); Sujit Jos, Bangalore (IN); Sandhya Patil, Bangalore (IN); Kannan Govindan, Bangalore (IN); Kiran Bynam, Jalahalli (IN); Manoj Choudhary, Bangalore (IN); Taeseok Kim, Hwaseong-si (KR); Youngsoo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 14/832,811

(22) Filed: Aug. 21, 2015

(65) Prior Publication Data

US 2016/0066346 A1 Mar. 3, 2016

(30) Foreign Application Priority Data

Sep. 3, 2014 (IN) .......................... 4299/CHE/2014
Feb. 26, 2015 (IN) .......................... 4299/CHE/2014
Aug. 4, 2015 (KR) ........................ 10-2015-0109969

(51) Int. Cl.
*H04W 4/00* (2009.01)
*H04W 74/08* (2009.01)
(Continued)

(52) U.S. Cl.
CPC ....... *H04W 74/0816* (2013.01); *H04W 48/10* (2013.01); *H04W 84/12* (2013.01)

(58) Field of Classification Search
CPC combination set(s) only.
See application file for complete search history.

(56) References Cited

U.S. PATENT DOCUMENTS 8,472,467 B2 6/2013 Oyman et al.
8,743,808 B2 6/2014 Cho et al.
(Continued)

FOREIGN PATENT DOCUMENTS

KR          10-1020839 B1    3/2011
KR     10-2013-0022038 A     3/2013

OTHER PUBLICATIONS

Buratti, Performance Analysis of IEEE 802.15.4 Beacon-Enabled Mode, IEEE, 15 pages, May 2010.*

(Continued)

*Primary Examiner* — Frank Duong
(74) *Attorney, Agent, or Firm* — NSIP Law

(57) ABSTRACT

A method and apparatus for a collision-free carrier sense multiple access (CSMA) are provided. The method of a node associated with a beacon enabled carrier sense multiple access (CSMA)-based wireless communication network through an access point (AP) includes receiving a beacon from the AP, the beacon comprising a back-off prime number and a beacon random number, and generating a back-off interval based on the beacon random number, the back-off prime number, a mapped identification (ID) of the node, and a current time slot of a frame of the beacon. The method and apparatus provide a collision-free CSMA scheme for a beacon enabled CSMA-based wireless communication network. In the collision-free CSMA scheme, uniformly distributed back-off intervals may be generated in a distributed fashion at each node for a CSMA-based wireless communication network. The back-off intervals may be correlated among the nodes even though the nodes do not communicate with each other.

21 Claims, 13 Drawing Sheets

(51) Int. Cl.
*H04W 48/10* (2009.01)
*H04W 84/12* (2009.01)

(56) References Cited

U.S. PATENT DOCUMENTS

| | | |
|---|---|---|
| 2005/0025176 A1 | 2/2005 | Ko et al. |
| 2006/0028984 A1 | 2/2006 | Wu et al. |
| 2010/0014457 A1 | 1/2010 | Nandagopalan |
| 2013/0010595 A1* | 1/2013 | Park et al. ............ H04W 28/08 370/231 |
| 2014/0307658 A1 | 10/2014 | Vedantham et al. |
| 2015/0163826 A1* | 6/2015 | Lakkis .................. H04W 74/08 370/336 |

OTHER PUBLICATIONS

Haas, Zygmunt J., and Jing Deng, "On Optimizing the Backoff Interval for Random Access Schemes," IEEE Transaction on Communication, vol. 51, No. 12, Dec. 2003, p. 2081-2090 (10 pages in English).

Tian, Xuejun, et al., "Improving Throughput and Fairness in WLANs through Dynamically Optimizing Backoff." IEICE Transactions on Communication vol. E88-B, No. 11, Nov. 2005, p. 4328-4338 (11 pages in English).

\* cited by examiner

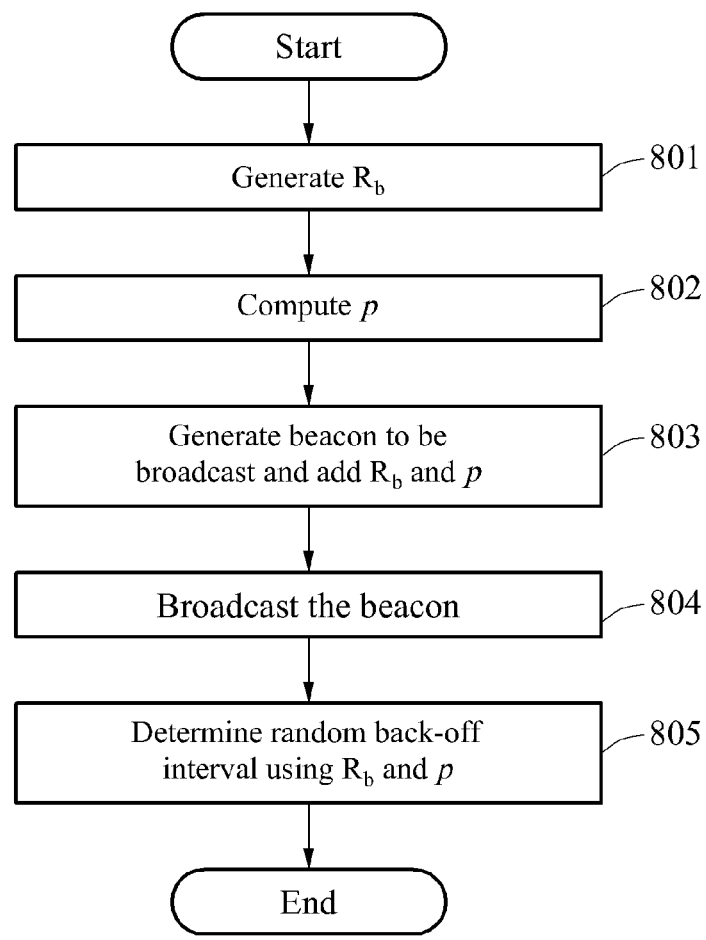

FIG. 9A

|    | t1 | t2 | t3 | t4 | t5 |
|----|----|----|----|----|----|
| N1 | 3  | .  | .  | X  |    |
| N2 | 2  | .  | X* |    |    |

FIG. 9B

|    | t1 | t2 | t3 | t4 | t5 |
|----|----|----|----|----|----|
| N1 | 4  | .  | .  | .  | X  |
| N2 |    | 2  | .  | X* |    |

METHOD AND APPARATUS TO ACHIEVE COLLISION-FREE RANDOM ACCESS

CROSS-REFERENCE TO RELATED APPLICATION(S)

This application claims the benefit under 35 USC 119(a) of Indian Patent Application No. 4299/CHE/2014, filed on Sep. 3, 2014, in the Indian Patent Office, Indian Patent Application No. 4299/CHE/2014, filed on Feb. 26, 2015 in the Indian Patent Office, and Korean Patent Application No. 10-2015-0109969, filed on Aug. 4, 2015, in the Korean Intellectual Property Office, the entire disclosures of which are incorporated herein by reference for all purposes.

BACKGROUND

1. Field

The following description relates to a carrier sense multiple access with collision avoidance (CSMA/CA) for wireless networks.

2. Description of Related Art

A carrier sense multiple access with collision avoidance (CSMA/CA) is a random access scheme used in wireless communication networks, for example, a wireless personal area network (WPAN), a wireless fidelity (Wi-Fi) based on an institute of electrical and electronics engineers (IEEE) 802.11 standard, a wireless local area network (WLAN), a low power WLAN, or a ZigBee based on an IEEE 802.15.4 standard.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an operating method of a node associated with a beacon enabled carrier sense multiple access (CSMA)-based wireless communication network through an access point (AP), the operating method including receiving a beacon from the AP, the beacon including a back-off prime number and a beacon random number, and generating a back-off interval based on the beacon random number, the back-off prime number, a mapped identification (ID) of the node, and a current time slot of a frame of the beacon.

The beacon random number may be generated as a uniformly distributed 16-bit random number over the beacon.

The beacon random number may be generated by a pseudorandom number generator.

The back-off prime number may be a fixed prime number, and may be at least one of a prime number less than a total number of nodes associated with the AP or a smallest prime number greater than the total number of the nodes associated with the AP.

The mapped ID may be generated by one-to-one mapping.

The mapped ID may be mapped to an integer between "1" and a total number of nodes associated with the AP.

The back-off interval may be generated as a sum of a value of "1" and a reduced back-off term.

The reduced back-off term may be generated as a remainder after a modulo operation of the back-off prime number with respect to a composite back-off term.

The composite back-off term may be generated as a sum of a beaconized-ID term and a primed-slot term.

The beaconized-ID term may be a product of a reduced beacon random number and the mapped ID.

The reduced beacon random number may be generated as a sum of "1" and a remainder after a modulo operation of a value obtained by subtracting "1" from the back-off prime number with respect to the beacon random number.

The primed-slot term may be generated as a product of the current time slot of the frame of the beacon and a value obtained by subtracting "1" from the back-off prime number.

In another general aspect there is provided an operating method of an AP connected to a beacon enabled CSMA-based wireless communication network, the operating method including broadcasting a beacon to all nodes associated with the AP, the beacon including a back-off prime number and a beacon random number.

The beacon random number may be generated as a uniformly distributed 16-bit random number over the beacon.

The beacon random number may be generated by a pseudorandom number generator.

The back-off prime number may be a fixed prime number.

The back-off prime number may be at least one of a prime number less than a total number of the nodes associated with the AP or a smallest prime number greater than the total number of the nodes associated with the AP.

A mapped identification (ID) of each of the nodes may be generated by one-to-one mapping.

The mapped ID may be mapped to an integer between "1" and the total number of the nodes associated with the AP.

In accordance with another general aspect there is provided a node associated with a beacon enabled CSMA-based wireless communication network through an AP, the node including a communication interface, and a processor connected to the communication interface, wherein the processor is configured to receive a beacon from the AP, the beacon including a back-off prime number and a beacon random number and to generate a back-off interval based on the beacon random number, the back-off prime number, a mapped ID of the node, and a current time slot of a frame of the beacon.

In accordance with another general aspect there is provided an access point (AP) connected to a beacon enabled carrier sense multiple access (CSMA)-based wireless communication network, the AP including a communication interface, and a processor configured to map a unique node ID to each node connected to the AP, and broadcast a beacon to all nodes associated with the AP, the beacon comprising a back-off prime number and a beacon random number.

The AP may include a personal area network (PAN) coordinator configured to obtain the number the nodes associated with the AP.

The controller may be further configured to de-map the unique node ID on a node being disconnected from the AP.

Other features and aspects will be apparent from the following detailed description, the drawings, and the claims.

BRIEF DESCRIPTION OF THE DRAWINGS

FIGS. 2 and 3 illustrate examples of a packet collision scenario.

FIG. 8 is a diagram illustrating an example of a process of generating correlated back-off intervals by nodes in a wireless communication network.

FIGS. 9A and 9B illustrate examples of a time orthogonal transmission.

Figure 1:
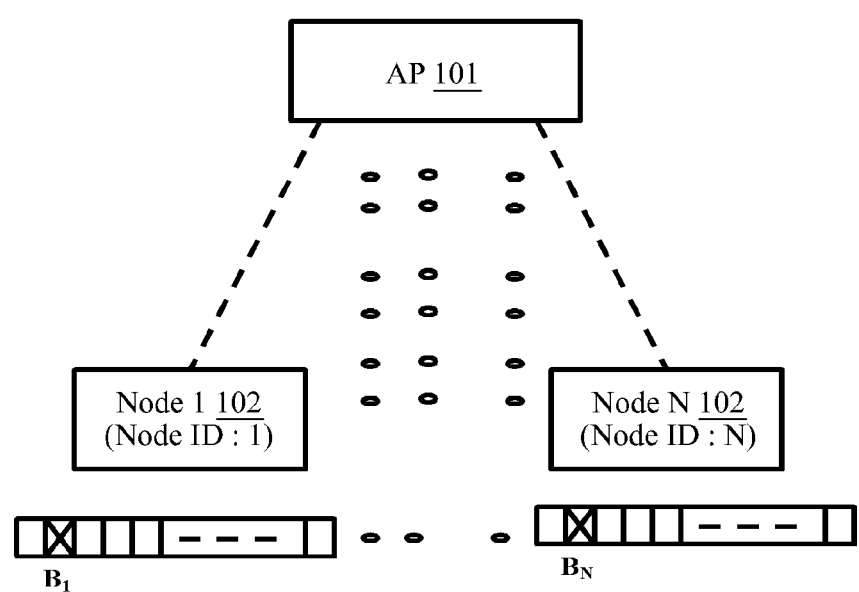
FIG. 1 illustrates an example of an independent back-off interval generation in a standard carrier sense multiple access with collision avoidance (CSMA/CA) scheme.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Various alterations and modifications may be made to the examples. Rather, the examples described herein have been provided so that this disclosure will be thorough and complete, and will convey the full scope of the disclosure to one of ordinary skill in the art.

In a carrier sense multiple access with collision avoidance (CSMA/CA) as a mandatory random access, nodes may independently determine a back-off interval for transmission. The nodes may be, for example, devices connected to a wireless communication network. A back-off counter (BC) may be decremented at every back-off slot until the BC reaches "0." A size of the BC may depend on the determined back-off interval. For example, when a node senses a free channel, the node may perform transmission after the BC reaches "0."

Figure 2:
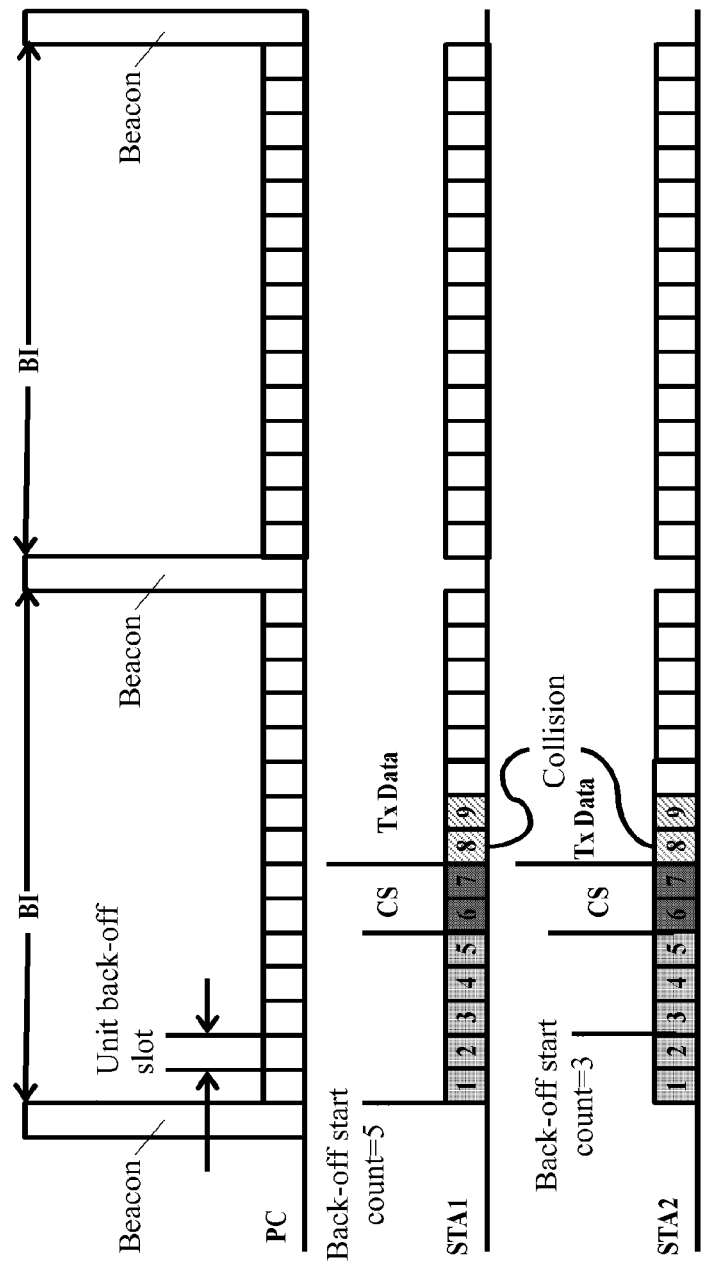
FIGS. 2, 3 and 4 illustrate examples of a random access in a CSMA scheme.
Figure 3:
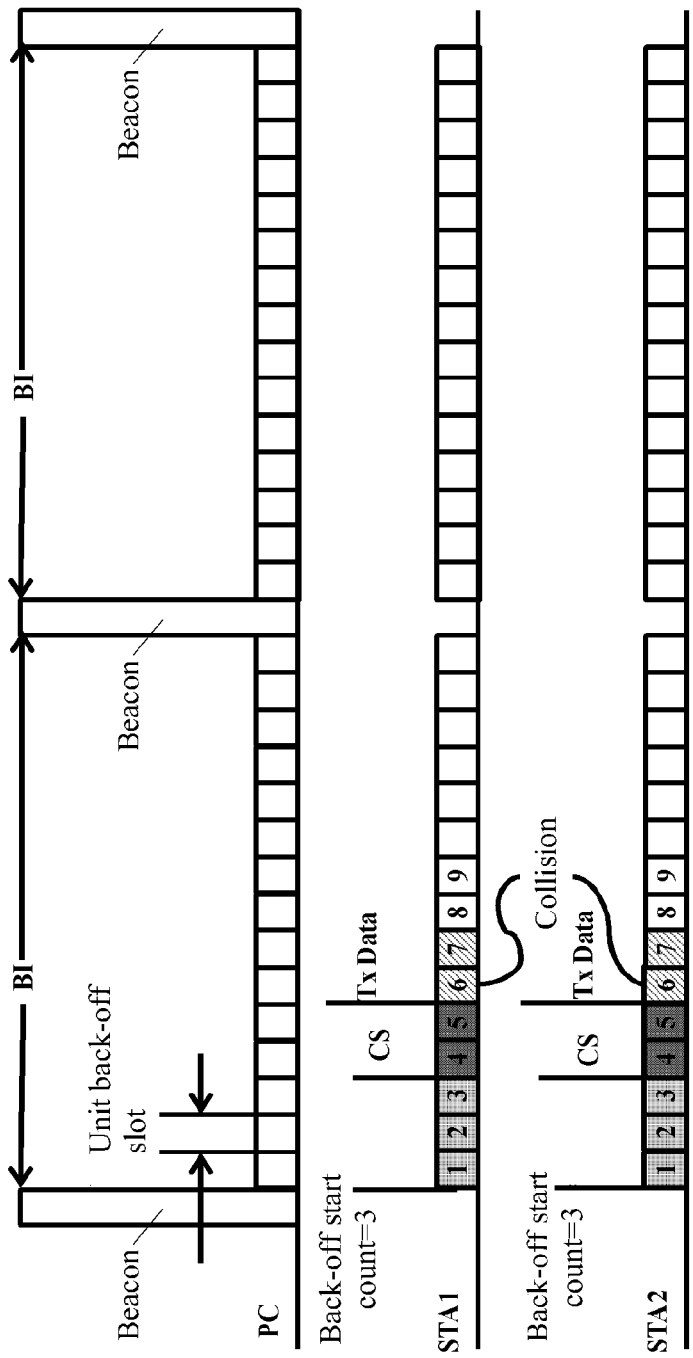
Figure 4:
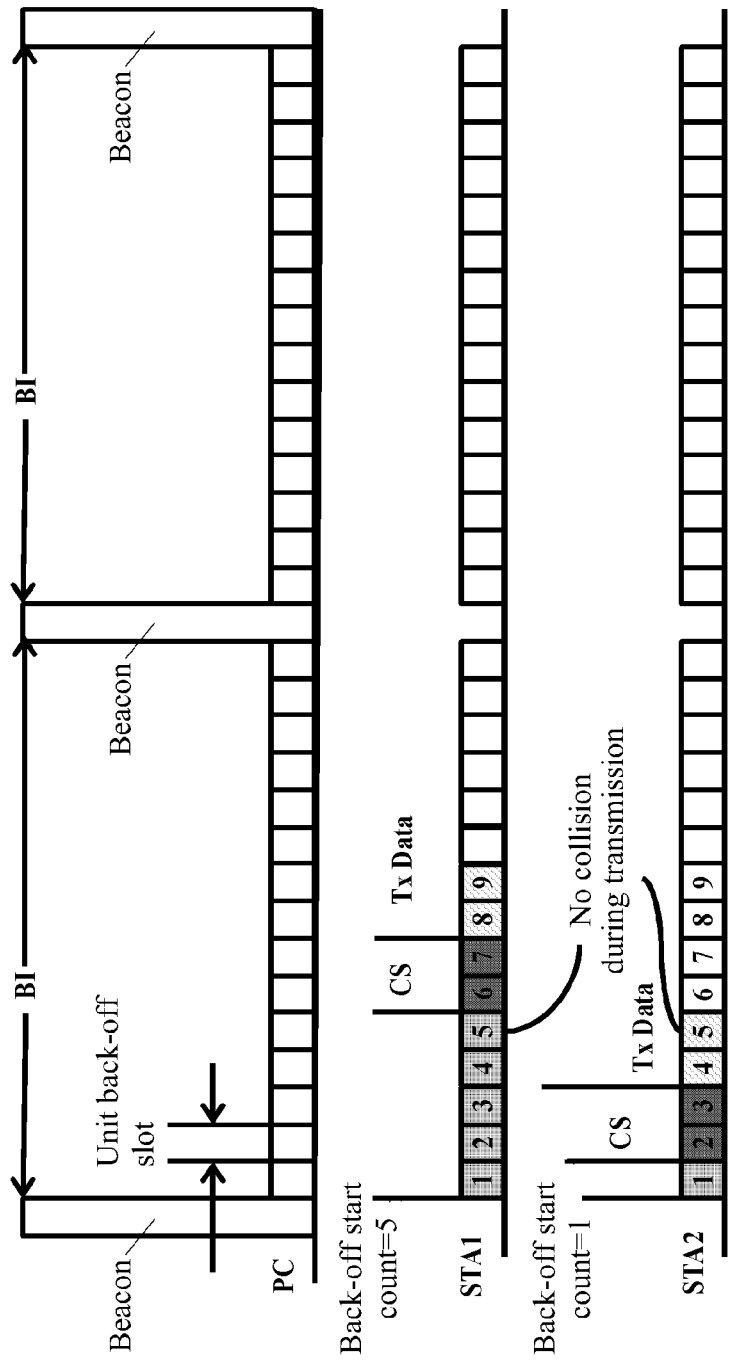

When at least two nodes transmit packets in the same time slot, the transmitted packets may collide with each other. In a CSMA scheme, each node may independently generate a back-off interval of each of the nodes, as shown in FIGS. 1 and 2. Therefore, a probability of back-off intervals leading to the same transmission slots may be non-zero as shown in FIGS. 3 and 4. In FIG. 3, a collision may occur when nodes select the same back-off interval in the same time slot. In FIG. 4, the nodes may select different back-off intervals in different time slots so that the BC is decremented to "0" in the same time slot. The above collision may critically affect a system performance.

According to an example, a collision-free (CF) CSMA scheme for a beacon enabled CSMA-based wireless network is provided.

According to an example, a collision-free CSMA scheme that generates back-off intervals in a distributed fashion for each node for a CSMA-based wireless network is provided. The back-off intervals may be correlated among the nodes even though the nodes do not communicate with each other.

According to an example, a method of generating a back-off interval by a node associated with a beacon enabled CSMA-based wireless communication network is provided. The node may be associated with the beacon enabled CSMA-based wireless communication network through an access point (AP). The method may include broadcasting, by the AP, a beacon to all nodes associated with the AP, the beacon including a back-off prime number and a beacon random number, and generating, by the node, the back-off interval based on the beacon random number, the back-off prime number, a mapped identification (ID) of the node and a current time slot of a frame of the beacon.

According to an example, a beacon enabled CSMA-based wireless communication network may include at least one AP and a node. The AP may be associated with at least one node, and may be configured to broadcast a beacon to all nodes associated with the AP. The beacon may include a back-off prime number and a beacon random number. The node may be configured to generate a back-off interval based on the beacon random number, the back-off prime number, a mapped ID of the node, and a current time slot of a frame of the beacon.

According to an example, an AP connected to a beacon enabled CSMA-based wireless communication network is provided. The AP may be associated with at least one node, and may be configured to broadcast a beacon to all nodes associated with the AP. The beacon may include a back-off prime number and a beacon random number.

According to an example, a node associated with a beacon enabled CSMA-based wireless communication network through at least one AP is provided. The node may be configured to generate a back-off interval based on a beacon random number, a back-off prime number, a mapped ID of the node, and a current time slot of a frame of a beacon. The beacon random number and the back-off prime number may be included in a beacon broadcast by the AP, and may be received by the node.

According to an example, a collision-free CSMA scheme for a beacon enabled CSMA-based wireless network is provided.

According to an example, a method to achieve a collision-free random access in a beacon enabled CSMA is provided. The method may include allocating transmission time orthogonal back-off intervals to nodes that communicate with each other, based on a generation of distinct numbers based on structural properties of a modulo algebra, for example, prime numbers. The time orthogonal back-off intervals may be obtained as a sum of a value of "1" and a remainder of a primed slot. The primed slot may be obtained as a sum of an in-slot term and an across-slot term. The in-slot term may be obtained by a modulo base prime operation on a product of a number R'b obtained by modifying a number Rb (that is, a beacon-identifier) broadcast in a beacon and a logical node ID by a base prime. The modified beacon may be obtained as a sum of a value of "1"

and a modulus of a beacon-identifier by a value obtained by decrementing the base prime by "1." The across-slot term may be obtained as a product of a current time slot and a numerical value less than the base prime. The beacon-identifier may be generated by a local generation scheme or a remote generation scheme. The local generation scheme may be obtained as an output of a pseudorandom number generator using a beacon sequence number as a common seed at each node. The remote generation scheme may be performed by each node receiving the same beacon-identifier from a central coordinator, for example, an AP.

According to an example, a collision-free CSMA scheme for a random access of a CSMA-based system is provided. A back-off interval generation method may enable a collision-free access while back-off intervals are generated in a distributed manner at each node included in the wireless communication network, without having an overhead of an intercommunication between the nodes.

According to an example, a method of generating back-off intervals in a correlated manner, but locally at nodes yielding a distinct transmission attempt time, is provided. The back-off intervals may be generated in the correlated manner instead of performing a communication among nodes in a distributed manner using a suitable device.

According to an example, a method of mixing a distinct logical ID and local time slot information at each node with correlation information, to obtain distinct back-off intervals for each node, and ensuring an almost uniform distribution due to a random beacon, is provided.

Figure 5:
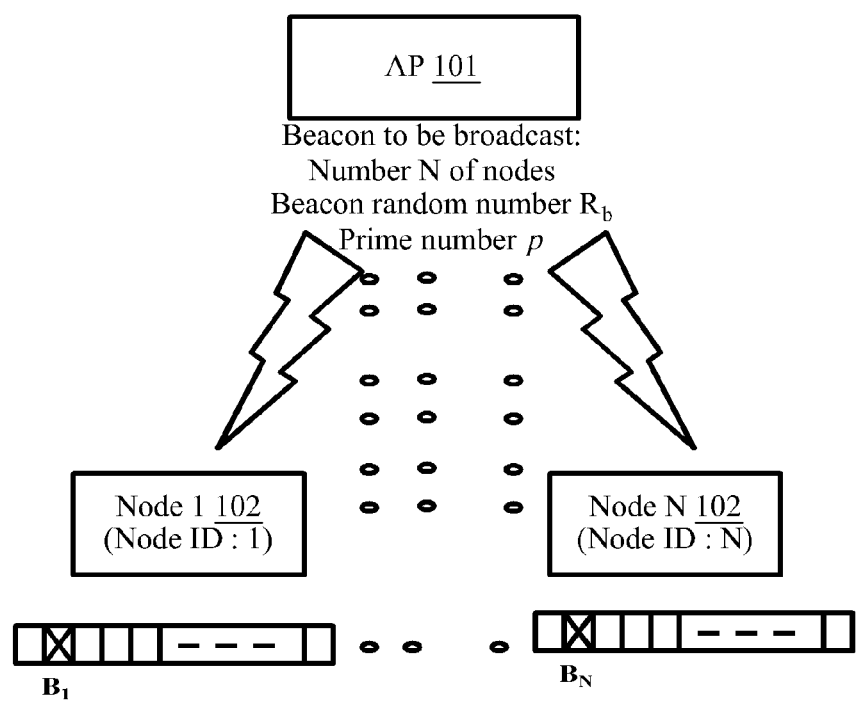
FIG. 5 illustrates an example of generating correlated back-off intervals by nodes in a wireless communication.

FIG. 5 illustrates an example of generating correlated back-off intervals by nodes in a wireless communication network in accordance with an example. Referring to FIG. 5, an AP 101 is connected to a plurality of nodes 102 in the wireless communication network. The wireless communication network may be s network, such as, for example, a wireless personal area network (WPAN), a wireless fidelity (Wi-Fi) based on an institute of electrical and electronics engineers (IEEE) 802.11 standard, a wireless local area network (WLAN), a low power WLAN, or a ZigBee based on an IEEE 802.15.4 standard, or other beacon enabled CSMA-based wireless communication networks. The AP 101 enables the nodes 102 to communicate. The communication may be, for example, communication among the nodes 102 using the AP 101, external networks other than the wireless communication network, or other possible forms of communication. The external networks may include, for example, the Internet, a local area network (LAN), a wide area network (WAN), a virtual private network (VPN), or a cloud. The nodes 102 may include, for example, a mobile phone, a smartphone, a tablet, a computer, a laptop, a wearable device, a medical device (for example, an electrocardiograph, an electromyograph, or a pedometer), or other devices capable of being connected to a beacon enabled CSMA-based wireless communication network and of performing communication in the beacon enabled CSMA-based wireless communication network. The nodes 102 may be connected to the AP 101 using a suitable wireless communication device.

The AP 101 broadcasts a beacon to all the nodes 102 connected to the AP 101. The beacon may include a total number of the nodes connected to the AP 101, a beacon random number Rb generated by the AP 101, and a prime number p.

In response to receiving the beacon, each of the nodes 102 generates a back-off interval, based on a plurality of factors, such as, for example, the total number of the nodes connected to the AP 101, the beacon random number Rb, the prime number p, or a time slot at which each of the nodes 102 starts to generate the back-off interval. Each of the nodes 102 uses the generated back-off interval to time the transmissions from the node 102.

Figure 6:
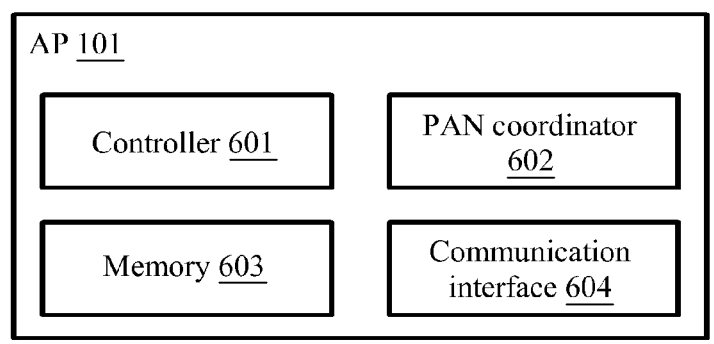
FIG. 6 is a diagram illustrating an example of a configuration of an access point (AP) of FIG. 5.

FIG. 6 is a diagram illustrating an example of a configuration of the AP 101 of FIG. 5. The AP 101 includes a controller 601, a personal area network (PAN) coordinator 602, a memory 603, and a communication interface 604. The memory 603 may be used to store data, for example, a total number N of nodes connected to the AP 101. In the example shown in FIG. 6, the memory 603 is included in the AP 101 as shown in FIG. 6. In another example, the memory 603 may be locally located outside the AP 101 and may be connected to the AP 101 using a suitable device via a wired or wireless connection. In yet another example, the memory 603 may be remotely located outside the AP 101 and may be connected to the AP 101 using a suitable device via a wired or wireless connection.

The communication interface 604 may include a device configured to enable the AP 101 to communicate with the nodes 102 and other devices. The communication interface 604 may enable the AP 101 to broadcast a beacon. The communication interface 604 may use any technology consistent with that disclosed herein, based on the configuration of the AP 101.

The controller 601 maps a unique node ID (for example, AssocShortAddress) to each node connected to the AP 101. The controller 601 maps a unique node ID to a node 102 connected to the AP 101. Similarly, the controller 601 de-maps the unique node ID on a node 102 disconnected from the AP 101. The controller 601 may map a unique node ID in a random number from a set SN={1, 2, . . . , N} in which N denotes a number of nodes currently associated with the AP 101. The controller 601 may store information associated with node IDs, for example the total number N of the nodes, in the memory 603.

Before a beacon to be broadcast is generated, the PAN coordinator 602 fetches the total number N of the nodes from the memory 603. The PAN coordinator 602 generates a beacon random number Rb, that is, a beacon identifier. The beacon random number may be up to a 16-bit number. The beacon random number may be a randomly distributed number over each beacon. The PAN coordinator 602 may locally generate the beacon random number using a suitable device, for example, a pseudorandom number generator using a beacon sequence number. The PAN coordinator 602 also generates a prime number p satisfying "p>N." The prime number p may be a least prime number to satisfy "p>N." The prime number p may be a fixed prime number that may be configured at the AP 101 and stored in the memory 603. The PAN coordinator 602 fetches the prime number p from the memory 603. The PAN coordinator 602 also generates the beacon to be broadcast. The beacon may include the total number N of the nodes connected to the AP 101, the beacon random number Rb generated by the AP 101, and the prime number p in beacon frames. When the beacon is generated, the PAN coordinator 602 broadcasts the beacon using the communication interface 604.

Figure 7:
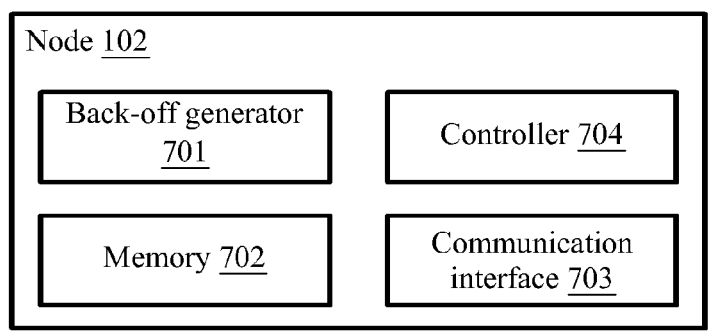
FIG. 7 is a diagram illustrating an example of a configuration of a node of FIG. 5.

FIG. 7 is a diagram illustrating an example of a configuration of one of the nodes 102 of FIG. 5. The node 102 of FIG. 7 includes a back-off generator 701, a memory 702, at least one communication interface 703, and a controller 704. The memory 702 may be included in the node 102. The communication interface 703 enables the node 102 to communicate with other external devices, for example, the AP 101.

In response to the beacon being broadcast from the AP 101 through the communication interface 604, the back-off generator 701 determines a random back-off interval $B_i$. The back-off generator 701 determines a back-off interval as a sum of a value of "1" and a reduced back-off term. The back-off generator 701 obtains the reduced back-off term as a remainder after a modulo operation of a back-off prime number with respect to a composite back-off term. The back-off generator 701 also obtains the composite back-off term as a sum of a beaconized-ID term and a primed-slot term. The beaconized-ID term may be a product of a reduced beacon random number and a mapped ID of a node. The back-off generator 701 obtains the reduced beacon random number as a sum of a value of "1" and a remainder after a modulo operation of a value obtained by subtracting "1" from the back-off prime number with respect to the beacon random number. The back-off generator 701 generates a primed-slot term as a product of a current slot and the value obtained by subtracting "1" from the back-off prime number.

The back-off generator 701 may determine the random back-off interval $B_i$ as $B_i=f(R'_b,i,t_{i_d},p)$ satisfying $f(R'_b,i,t_{i_d},p)=(R'_b*i+(p-1)*t_{i_d})_{mod(p)}+1$ and $R'_b=(R_b)_{mod(p-1)}+1$.

Here, $t_{i_d}$ denotes a time slot, i denotes an i-th node, and d denotes a d-th time slot. In addition, p denotes a back-off prime number, and $R^b$ denotes a reduced beacon random number.

The back-off generator 701 may locally count a time within a beacon interval starting from a beacon frame, because the time within the beacon interval is slotted in a fixed duration. For example, a unit back-off slot may be a duration of 20 symbols.

The back-off generator 701 determines the back-off interval immediately in response to a beacon being broadcast. The back-off generator 701 may also generate a back-off interval at an arbitrary point in time, and at least required information in the broadcast beacon may be stored in the memory 702. The back-off generator 701 may fetch the required information from the memory 702.

The controller 704 performs a synchronization and/or communication using the interface 703, based on a scheduled time and/or the back-off interval.

FIG. 8 is a diagram illustrating an example of a process of generating correlated back-off intervals by nodes in a wireless communication network. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. The above descriptions of FIGS. 1-7, is also applicable to FIG. 8, and is incorporated herein by reference. Thus, the above description may not be repeated here.

In 801, the AP 101 of FIG. 5 generates a beacon random number Rb that may be a randomly distributed number. In 802, the AP 101 generates a prime number p satisfying "p>N" in which N denotes a total number of active nodes associated to the AP 101. The AP 101 may select the prime number p as a least prime number satisfying "p>N." The prime number p may be a fixed prime number that may be configured at the AP. In 803, the PAN coordinator 602 of FIG. 6 generates a beacon to be broadcast. The beacon may include a total number N of nodes connected to the AP 101, the beacon random number Rb generated by the AP 101 and the prime number p. In 804, the AP 101 broadcasts the generated beacon. In 805, in response to the beacon being broadcast from the AP 101, each of the nodes 102 determines a random back-off interval $B_i$ as $B_i=f(R'_b,i,t_{i_d},p)$ satisfying $f(R'_b,i,t_{i_d},p)=(R'_b*i+(p-1)*t_{i_d})_{mod(p)}+1$ and $R'_b=(R_b)_{mod(p-1)}+1$.

Each of the nodes 102 counts a time within a beacon interval starting from a beacon frame, because the time within the beacon interval is slotted in a fixed duration.

According to an example, the AP 101 may broadcast the prime number p at an arbitrary point in time, independent of the broadcast beacon.

According to an example, the node 102 may locally generate a beacon random number using a linear feedback shift register (LFSR) pseudorandom number generator included in the node 102. The node 102 may use a beacon sequence number included in the received beacon. The beacon sequence number may be stored in a beacon protocol data unit (PDU). In addition, all nodes may have the same generator polynomial of an LFSR.

According to an example, in a collision-free CSMA, a back-off interval generated by each of the nodes 102 may lead to time orthogonal transmission. The nodes 102 may not attempt to perform transmission in the same time slot and thus, it is possible to reduce a transmission collision.

According to an example, back-off intervals may be generated in a correlated manner but locally in a distributed manner at each node even though the nodes do not communicate with each other. When the nodes do not communicate with each other, an extra overhead may not occur. Also, a number in every beacon field correlated with a node may be broadcast, and a randomized number for a non-priority for a channel accessing among nodes may be used.

According to an example, a localized distinction by using a distinct node ID and back-off generation time information is provided. The correlation and distinctness may be used together to bring a transmission time orthogonality in back-off intervals.

According to an example, an exclusive orthogonal back-off counter generation may be required, and a back-off coordination and back-off distinction may be simultaneously performed.

According to an example, the beacon random number may be used in a back-off coordination to avoid a channel access bias to an arbitrary node.

According to an example, a level 1 distinction may be achieved in a back-off distinction using node IDs used to distinguish different nodes. Also, a level 2 distinction may be achieved based on a back-off generation time (for example, a time slot number).

A transmission vector (for example, a node i) may be assumed as Ui(ti)=[0, 0, ..., 0, 1, 0, ..., 0] in which a ti-th element represents a transmission slot set to be "1." For example, when an active set $\Sigma_{i=1}^{W}U_i(t)$. $U_j(t)=0, \forall i \neq j$ holds true, a time orthogonal transmission in a back-off interval W may occur.

As shown in FIG. 9A, a time orthogonal transmission in a back-off interval may require all nodes to have distinct random back-off intervals when the random back-off intervals are generated at the same slot. Transmission attempts may be distinguished when the random back-off intervals are generated at different time slots, as shown in FIG. 9B. In FIGS. 9A and 9B, X denotes a transmission and X* denotes a winning transmission. Also, a time orthogonality may hold for an arbitrary value of the back-off interval W.

Sp may be assumed as a set including all integers in an interval [1,p−1] in which p denotes an arbitrary prime number. For $i \neq j \in S_p$ under a modulo-p multiplication, the following conditions may be provided:

$(k,i)_{mod\ p} \neq (k,j)_{mod\ p} \forall k \in S_p;$  a)

and $(k,i)_{mod\ p} \neq 0 \forall i,k \in S_p.$  b)

When $(k,i)_{mod\ p}=(k,j)_{mod\ p}$ is satisfied, $(k(i-j))_{mod\ p} = (0)_{mod\ p}$, which may imply that a prime number p divides either k or (i−j). Because "k<p" is satisfied, "(i−j)modp<p" may be satisfied, which is a contradiction. Therefore, $(k,i)_{mod\ p} \neq (k,j)_{mod\ p} \forall k \in S_p$. In other words, case "a" is proved. Case "b" may also be proved based on a similar argument.

A back-off interval of a node i∈[1, N] may be selected with the prime number p satisfying "p>N" as $B_i = )R'_b*i+(p-1)*t_{i_d})_{mod(p)}+1$ in which $R'_b=(R_b)_{mod(p-1)}+1$.

Back-off intervals may be obtained so that transmission times are orthogonal for all nodes. Based on the above description, the back-off intervals for each node may be distinguished from each other, in view of the following two parts:

Random back-off intervals $B_i$ generated at a given slot are distinguished from each other for all nodes. In other words, $B_i \neq B_j$, $\forall i \neq j \in [1,N]$, $t_{id}=t_{jd}$ are satisfied; and Based on a fact that $t_{id}=t_{jd}=t$, the back-off interval is reduced to $B_i=(R'_b*i+(p-1)*t_{i_d})_{mod(p)}+1$ from $R'_b*i \neq R'_b*j$, $\forall i \neq j \in [1,N]$. An addition of a constant term (p−1)*tj may maintain a distinctiveness. Therefore, $(R'_b*i+(p-1)*t)_{mod(p)} \neq (R'b*j+(p-1)*t)_{mod\ p} \forall i \neq j$ may be satisfied. Thus, $B_i \neq B_j$, $\forall i \neq j \in [1,N]$, $t_{id}=t_{jd}$ may be satisfied.

An addition of a value of "1" may be performed in cases other than a case of $R_b=0$. Therefore, this is proved.

Random back-off intervals $B_i$ generated in different slots are distinguished from each other for all nodes. In other words, $B_i \neq B_j$, $\forall i \neq j \in [1,N]$, $t_{id} \neq t_{jd}$ are satisfied.

This may correspond to FIG. 9A of a time orthogonal transmission. $B_i$ may not need to be equal to $B_j$ because $t_{id}$ is not equal to $t_{jd}$ even when $R'_b*i \neq R'_b*j$ is satisfied. This contradiction may be hereby shown. Therefore, for a collision occurring in the above example, the following example has to occur:

When $t_{id} > t_{jd}$, $p > \Delta t$ is assumed, $B_i - B_j = t_{id} - t_{jd} = \Delta t$ may be satisfied. A subtraction of $B_j$ from $B_i$ may be performed as shown in $B_i - B_j = (R'_b*i+(p-1)*t)_{mod\ p} - (R'_b*i+(p-1)*t)_{mod\ p} = \Delta t$ in which $(R'_b*(i-j))_{mod\ p} - (p\Delta t)_{mod\ p} - (R'_b*(i-j))_{mod\ p} - 0$.

Because $R'_b$ is greater than "0" due to a modulo p operation and "$(i-j)_{modp}>0$" by definition, a left hand side (LHS) may not be equal to "0." Thus, the LHS may not be equal to a right hand side (RHS). This is impossible and accordingly, $B_i$ may not be equal to $B_j$.

A similar argument may be applied when $t_{id}$ is less than $t_{jd}$. This may be proved by combining parts i and ii.

In an example of an IEEE 802.15.4 ZigBee network with a 1 PAN coordinator, N nodes, in which N is an integer greater than "1" and less than "45," and the ZigBee network may be set as BO=3 and SO=4. A media access control (MAC) payload packet may have a size of 50 bytes. When it is assumed that a hidden node does not exist, no loss may occur (channel conditions). A performance matrix, for example, a throughput and an energy efficiency may be used. The throughput refers to a number of bits successfully transmitted per second, and the energy efficiency refers to a number of joules consumed per successfully transmitted bit.

Figure 10:
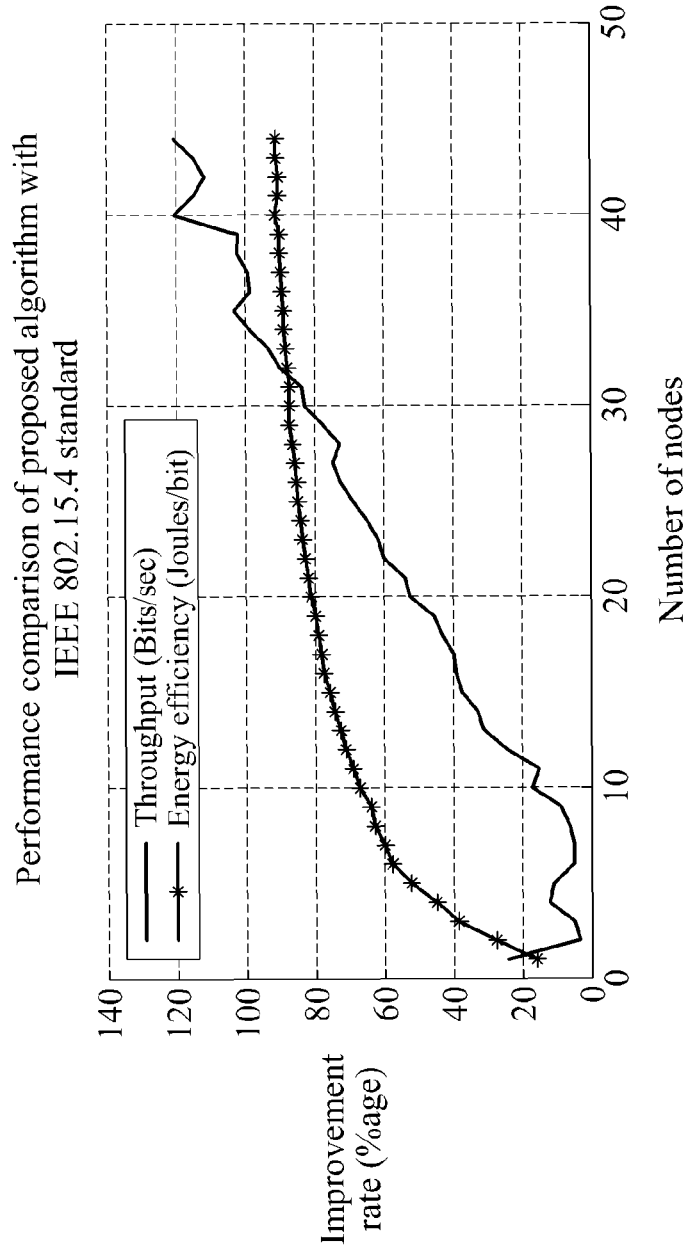
FIGS. 10, 11, 12, 13, 14 and 15 illustrate examples of simulations of generating correlated back-off intervals by nodes in a wireless communication network.
Figure 11:
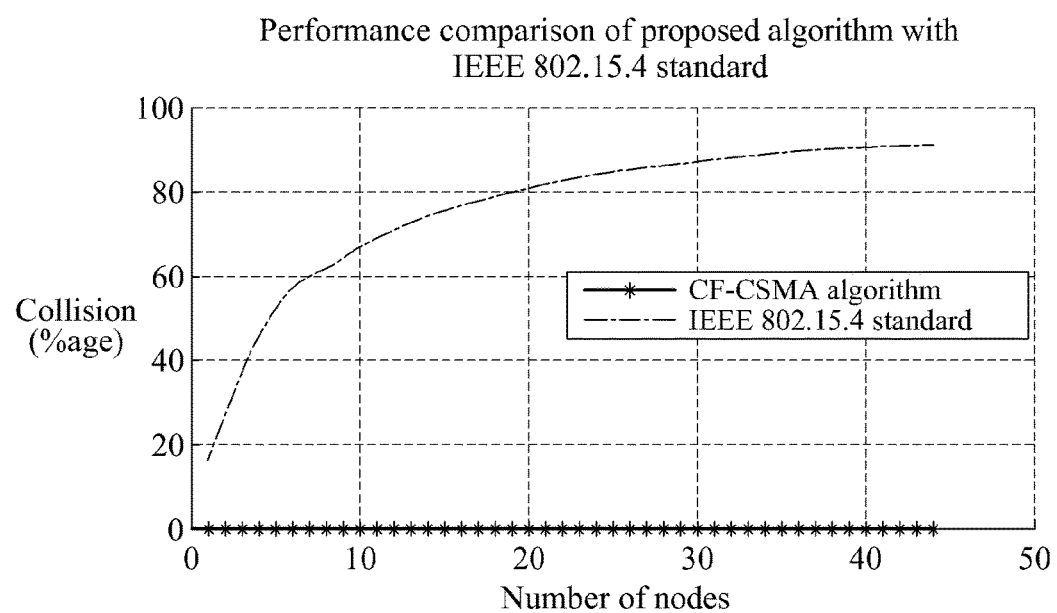

Referring to FIGS. 10 and 11, a back-off window (prime number) p is f(N) satisfying "least prime number>N." It is observed that there is no collision, that a throughput is enhanced in comparison with the IEEE 802.15.4 standard, and that an energy efficiency is significantly enhanced in comparison with the IEEE 802.15.4 standard.

Figure 12:
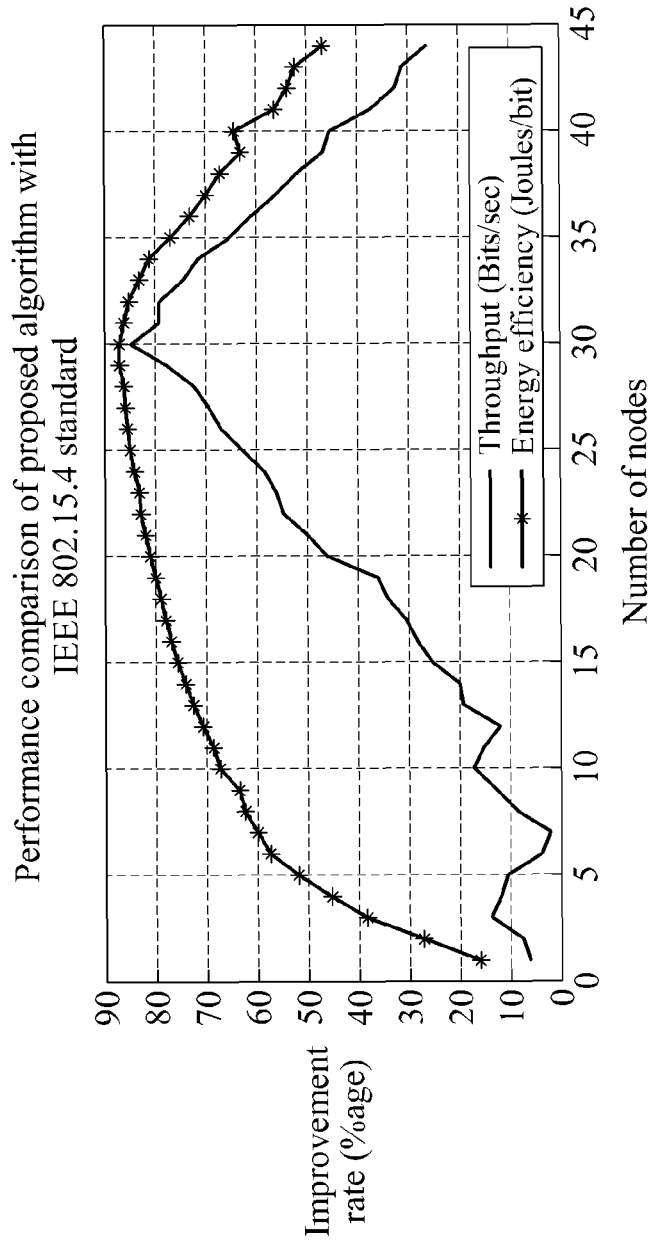
Figure 13:
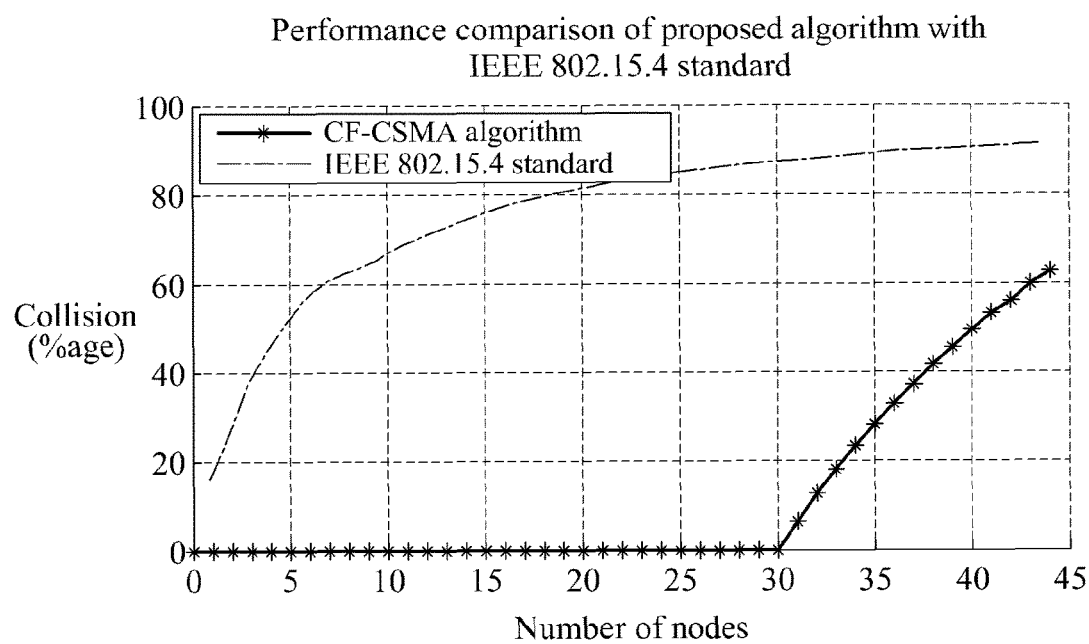

Referring to FIGS. 12 and 13, a back-off window (prime number) p is "31." It is observed that there is no collision when a number N of nodes is less than 31, that a throughput is enhanced in comparison with the IEEE 802.15.4 standard, and that an energy efficiency is significantly enhanced in comparison with the IEEE 802.15.4 standard.

Figure 14:
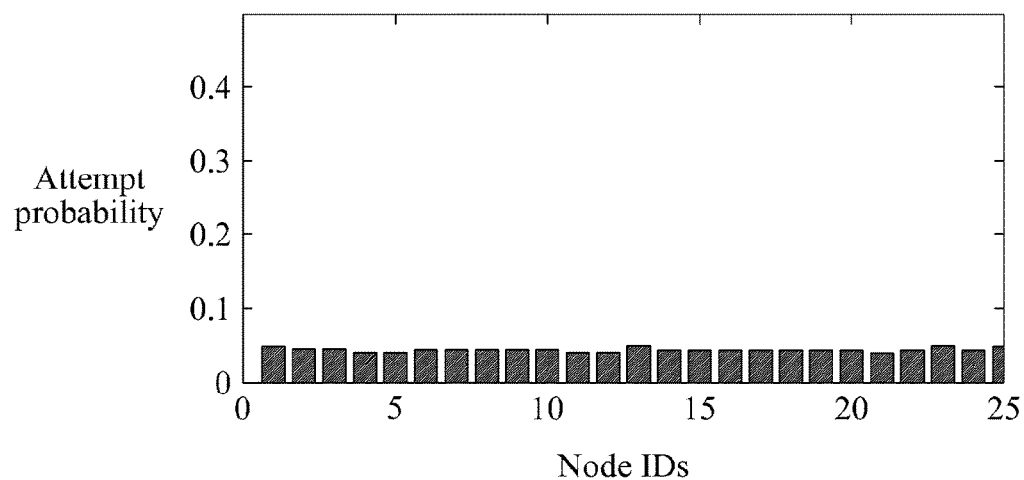
Figure 15:
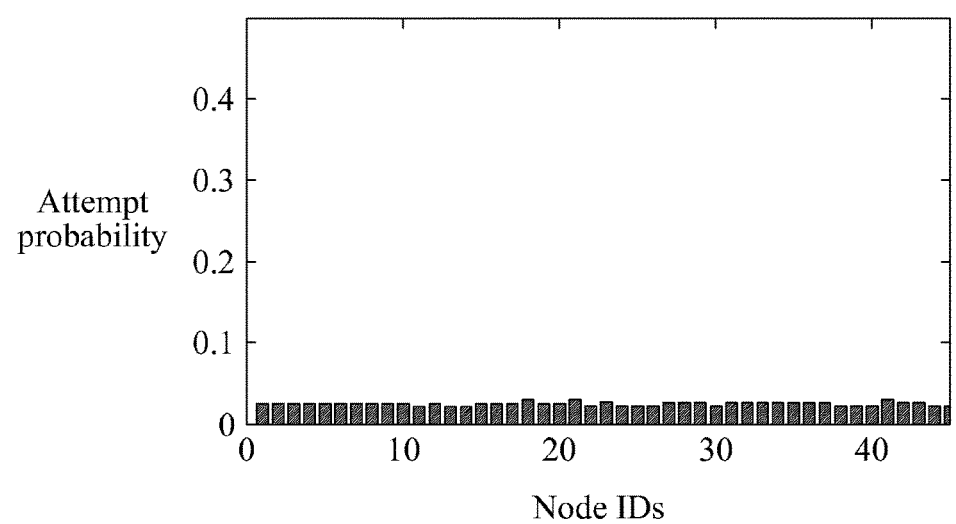

FIG. 14 illustrates a transmission attempt probability in a simulation in which a number N of nodes is set to "25." FIG. 15 illustrates a transmission attempt probability in a simulation in which a number N of nodes is set to "45." It is observed that the nodes attempt to perform transmission at an almost equal probability, which may indicate almost uniformly distributed back-off intervals.

The examples disclosed herein outperform the IEEE 802.15.4 standard in terms of a collision percentage. Also, the throughput and the energy efficiency are enhanced beyond 50% as shown in FIGS. 10 and 12. The examples disclosed herein improve a fair back-off interval.

According to an example, when a back-off prime number is less than a total number of nodes associated with an AP, a collision rate may be reduced. When the back-off prime number is a least prime number greater than the total number of the nodes associated with the AP, a collision may not occur.

Using of the IEEE 802.15.4 standard, for example a beacon enabled CSMA, have been described above as an example. It may be obvious to one of ordinary skill in the art to implement an embodiment of an arbitrary wireless communication network based on a CSMA.

The apparatuses, units, modules, devices, and other components illustrated that perform the operations described herein are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 8 that perform the operations described herein are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operating method, using one or more processors, of a node associated with a beacon enabled carrier sense multiple access (CSMA)-based wireless communication network through an access point (AP), the operating method comprising:
   receiving a beacon from the AP, the beacon comprising a fixed back-off prime number and a constant beacon random number;
   generating a back-off interval based on the constant beacon random number, the fixed back-off prime number, a mapped identification (ID) of the node, and a current time slot of a frame of the beacon; and
   communicating at the node using the back-off interval in a collision-free manner with other nodes.

2. The method of claim 1, wherein the constant beacon random number is generated as a uniformly distributed 16-bit random number over the beacon.

3. The method of claim 1, wherein the constant beacon random number is generated by a pseudorandom number generator.

4. The method of claim 1, wherein the fixed back-off prime number is a fixed prime number, and is at least one of a prime number less than a total number of nodes associated with the AP or a smallest prime number greater than the total number of the nodes associated with the AP.

5. The method of claim 1, wherein the mapped ID is generated by one-to-one mapping.

6. The method of claim 1, wherein the mapped ID is mapped to an integer between "1" and a total number of nodes associated with the AP.

7. The method of claim 1, wherein the back-off interval is generated as a sum of a value of "1" and a reduced back-off term.

8. The method of claim 7, wherein the reduced back-off term is generated as a remainder after a modulo operation of the fixed back-off prime number with respect to a composite back-off term.

9. The method of claim 8, wherein the composite back-off term is generated as a sum of a beaconized-ID term and a primed-slot term.

10. The method of claim 9, wherein the beaconized-ID term is a product of a reduced beacon random number and the mapped ID.

11. The method of claim 10, wherein the reduced beacon random number is generated as a sum of "1" and a remainder after a modulo operation of a value obtained by subtracting "1" from the fixed back-off prime number with respect to the constant beacon random number.

12. The method of claim 9, wherein the primed-slot term is generated as a product of the current time slot of the frame of the beacon and a value obtained by subtracting "1" from the fixed back-off prime number.

13. The method of claim 1, wherein the back-off interval is $f(R'_b, i, t_{i_d}, p)$ satisfying $f(R'_b, i, t_{i_d}, p) = (R'_b * i + (p-1) * t_{i_d})_{mod(p)} + 1$ and $R'_b = (R_b)_{mod(p-1)} + 1$, wherein $t_{i_d}$ denotes a time slot, i denotes an i-th node, and d denotes a d-th time slot, p denotes the fixed back-off prime number, and $R^b$ denotes the constant beacon random number.

14. An operating method, using one or more processors, of an access point (AP) connected to a beacon enabled carrier sense multiple access (CSMA)-based wireless communication network, the operating method comprising:
broadcasting a beacon to all nodes associated with the AP, the beacon comprising a fixed back-off prime number and a constant beacon random number, wherein the beacon is used by the nodes to generate a back-off interval to ensure communication in a collision-free manner with other nodes.

15. The method of claim 14, wherein the constant beacon random number is generated by a pseudorandom number generator.

16. The method of claim 14, wherein the fixed back-off prime number is a fixed prime number.

17. The method of claim 16, wherein the fixed back-off prime number is at least one of a prime number less than a total number of the nodes associated with the AP or a smallest prime number greater than the total number of the nodes associated with the AP.

18. The method of claim 14, wherein a mapped identification (ID) of each of the nodes is generated by one-to-one mapping.

19. The method of claim 14, wherein the mapped ID is mapped to an integer between "1" and the total number of the nodes associated with the AP.

20. The method of claim 14, wherein the constant beacon random number is generated as a uniformly distributed 16-bit random number over the beacon.

21. A node associated with a beacon enabled carrier sense multiple access (CSMA)-based wireless communication network through an access point (AP), the node comprising:
a communication interface; and
a processor configured to:
receive a beacon from the AP, the beacon comprising a fixed back-off prime number and a constant beacon random number;
generate a back-off interval based on the constant beacon random number, the fixed back-off prime number, a mapped identification (ID) of the node, and a current time slot of a frame of the beacon; and
communicate at the node using the back-off interval in a collision-free manner with other nodes.

* * * * *